J. C. HOUSE.
Apparatus for Agitating Milk in Cheese Vats.
No. 68,198. Patented Aug. 27, 1867.
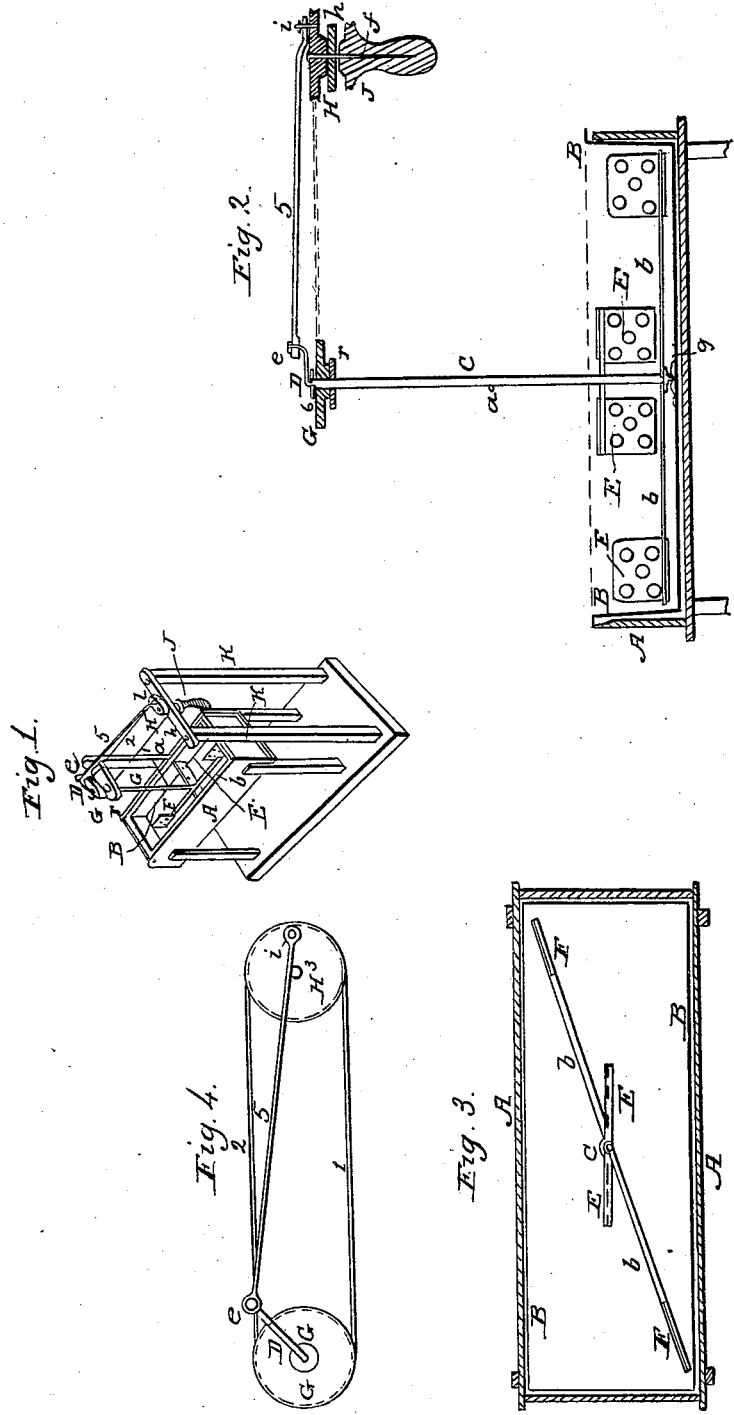
Witnesses:
A. C. Kling
Ch. A. Babcock.
Inventor.
J. Carroll House

United States Patent Office.

J. CARROLL HOUSE, OF LOWVILLE, NEW YORK.

Letters Patent No. 68,198, dated August 27, 1867.

IMPROVEMENT IN APPARATUS FOR AGITATION OF MILK IN CHEESE-VATS.

*The Schedule referred to in these Letters Patent and making part of the same.*

Be it known that I, J. CARROLL HOUSE, of the town of Lowville, county of Lewis, and State of New York, have invented a new and useful Apparatus for the Agitation of Milk in Cheese-Vats, for the purpose of assisting in withdrawing the animal heat, and the prevention of the separation of the cream from the night's milk before the second or morning's milking is added thereto; and I do hereby declare that the following is a full, clear, and exact description of the construction and operation of the same, reference being had to the annexed drawings, making part of this specification, in which—

Figure 1 is a perspective view of the whole arrangement.

Figure 2 is a vertical section, showing the construction of the same.

Figure 3 is a horizontal section from A to A, fig. 2.

Figure 4 is a plan view of the pulleys and crank-attachment—

Like letters referring to similar parts.

A A are the outside wooden jacket of any of the cheese-making apparatus in general use, within which is the sheet-metal vat B B, between which and the outer jacket is an annular space for water to circulate. In the centre of the bottom of the vat B B is securely soldered the metal step $g$. In this step sets the foot of the vertical round iron shaft D, the upper end of which is formed into the crank $e$. Attached to this shaft, near its bottom end, are the horizontal arms $b\ b$, extending on opposite sides to the ends of the vat B B. Upon the extremities of these arms are the perforated paddles F F, securely attached. C is a hollow shaft, enclosing and revolving around the centre shaft, and having secured to it, a short distance above the bottom, the short horizontal arms and paddles E E. On the upper end of this hollow shaft is the pulley G, by which a rotary motion may be imparted to the same. $r$ is a support for the upper end of the shaft C, and in which it freely revolves. The shafts are further secured in a vertical position by the metal stay at $a$. H is a second pulley, corresponding to G, and connected with it by the band 1–2, and also made fast to the motive-pulley J, by the bolt 3, which passes through and freely revolves in the cross-bar of the support $h\ k\ k$. A crank-pin, $i$, is inserted in the pulley H, which is connected with the crank $e$, upon the upright shaft D, by the rod 5.

Operation.

The night's milk, directly from the cows, being run into the vat, the water is turned on around the same in the tank or jacket A A, circulating around the milk in the annular space between the jacket and vat; a slow but constant rotary motion being given to the pulley H, by banding from the drive-pulley J to any motive power at the disposal of the operator, wind, steam, &c., or the power obtained by a falling weight, properly geared and regulated. This motion thus given to H is imparted to the pulley G by the band 1–2, causing a steady revolution of the hollow shaft C, and the arms and paddles E E. A vibratory motion is at the same time given by the crank-pin $i$ through the connecting-rod 5 and crank $e$ to the centre shaft D, and through it to the horizontal arms $b\ b$, and their attached paddles F F; the relative motion of the crank-pin $i$ and the crank $e$ being so arranged as to cause the paddles F F to traverse the width of the vat B B. The constant revolution of the paddles E E, in the centre of the vat, causes a current to set from one end of the same to the other and back upon the opposite side, following the rotation of the paddles, while the vibratory action of the paddles F F, in the extreme ends of the vat, precludes the possibility of the milk remaining for a moment at rest.

The warm milk being thus constantly brought in contact with the cool metal of the vat, soon parts with its excess of animal heat, and is thus kept from souring, while the gentle agitation, continued, if need be through the night, precludes the separation of the creamy from the other portions of the milk, and is thus kept in fine condition for mingling with the new milk of the morning's milking, and the after-steps in the processes of cheese-making.

Having thus described the construction and working of the several parts of my invention, what I claim, and desire to secure by Letters Patent, is—

The use of the compound vibrating rotary dasher D $b$ F C E, with the pulley G, crank $e$, together with the crank-pulley H, and their connections, as and for the object herein specified.

J. CARROLL HOUSE.

Witnesses:
A. C. KLING,
M. A. BABCOCK.